(12) United States Patent
Lim et al.

(10) Patent No.: US 10,634,541 B2
(45) Date of Patent: Apr. 28, 2020

(54) METHODS FOR SAFE OPERATION OF A COOKTOP APPLIANCE

(71) Applicant: Haier US Appliance Solutions, Inc., Wilmington, DE (US)

(72) Inventors: Tae-Hoon Lim, Seongnam-si (KR); Jungin Kim, Seoul (KR); Younghan Choi, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 227 days.

(21) Appl. No.: 15/925,886

(22) Filed: Mar. 20, 2018

(65) Prior Publication Data

US 2019/0293470 A1 Sep. 26, 2019

(51) Int. Cl.
G01F 23/22 (2006.01)

(52) U.S. Cl.
CPC .......... *G01F 23/22* (2013.01); *H05B 2213/07* (2013.01)

(58) Field of Classification Search
CPC ...... G01F 23/22; G01F 23/247; G01F 23/248; H05B 2213/07; H05B 6/062; H05B 6/1209; H04L 12/2827; G01K 2207/04; G01K 2207/06; G01K 2207/08; A47J 37/1266

See application file for complete search history.

(56) References Cited

U.S. PATENT DOCUMENTS

| | | | | |
|---|---|---|---|---|
| 6,118,105 A | * | 9/2000 | Berkcan | H05B 1/0266 219/449.1 |
| 7,105,781 B2 | * | 9/2006 | Wilkins | H05B 3/746 219/494 |
| 7,573,005 B2 | * | 8/2009 | Clothier | H05B 3/746 219/412 |
| 8,884,196 B2 | | 11/2014 | Jeanneteau et al. | |
| 9,191,998 B2 | * | 11/2015 | Hegedis | A47J 36/321 |
| 9,357,881 B2 | * | 6/2016 | Gardner | G01F 23/246 |
| 10,390,658 B2 | * | 8/2019 | Gardner | A47J 37/1266 |
| 2005/0016990 A1 | * | 1/2005 | Wilkins | H05B 3/746 219/494 |
| 2005/0247696 A1 | * | 11/2005 | Clothier | H05B 3/746 219/497 |
| 2013/0112683 A1 | * | 5/2013 | Hegedis | H05B 6/062 219/660 |
| 2013/0295245 A1 | * | 11/2013 | Gardner | A47J 37/1266 426/233 |
| 2016/0014849 A1 | * | 1/2016 | Hegedis | H05B 6/1263 219/627 |
| 2016/0270595 A1 | * | 9/2016 | Gardner | G01F 23/248 |
| 2016/0298995 A1 | * | 10/2016 | Yeong | G01F 23/0007 |

FOREIGN PATENT DOCUMENTS

JP 2008293890 A 12/2008

* cited by examiner

*Primary Examiner* — Nathaniel J Kolb
(74) *Attorney, Agent, or Firm* — Dority & Manning, P.A.

(57) ABSTRACT

A cooktop appliance and methods for safely operating a cooktop appliance are provided. In particular, in instances when a cooking utensil is filled with a liquid and a cooking operation is performed, the cooktop appliance and methods provided herein include features that prevent a dried cooking utensil condition and/or a low liquid level condition, e.g., to prevent fires and/or to enhance cooking performance.

8 Claims, 7 Drawing Sheets

METHODS FOR SAFE OPERATION OF A COOKTOP APPLIANCE

FIELD OF THE INVENTION

The present subject matter relates generally to cooktop appliances, and more particularly to methods for safely operating cooktop appliances.

BACKGROUND OF THE INVENTION

Cooktop appliances generally include heating elements for heating cooking utensils, such e.g., pots, pans, and griddles. A user can select a desired heating level, and operation of the heating elements is modified to match the desired heating level. For example, certain cooktop appliances include induction heating elements. During operation, the cooktop appliance operates the induction heating elements at a predetermined power output corresponding to a selected heating level.

In some cooking operations, such as a sous vide, liquid is filled into a cooking utensil and one or more food items are submerged within the liquid. The cooking utensil is positioned on a heating element and the food items are cooked within the heated liquid. In some instances, the food items are cooked within the liquid for extended periods of time. Various challenges may arise during such cooking operations. For example, in some instances, the liquid within the container may evaporate to a level where the cooking utensil becomes burnt by the heating element. This "dried pot" or "dried cooking utensil" condition may cause fires. As users frequently leave the cooking area during such long cooking operations, fires can spread throughout a user's kitchen and home. In other instances, the liquid within the container may evaporate to a level where the liquid is insufficient or otherwise too low to properly cook the food items within the liquid. Such a low liquid condition may lead to unsatisfactory cooking performance and may eventually lead to a dried cooking utensil condition.

In some other cooking operations, liquid is filled into a cooking utensil, placed on a heating element, and then the liquid is brought to a boil. In some instances, the liquid within the cooking utensil evaporates to a point where the cooking utensil becomes burnt by the heating element. Such conditions may cause fires and may damage the cooking utensil, as noted above.

Accordingly, a cooktop appliance with features for avoiding such undesired dried cooking utensil and low liquid level conditions would be useful.

BRIEF DESCRIPTION OF THE INVENTION

Aspects and advantages of the invention will be set forth in part in the following description, or may be apparent from the description, or may be learned through practice of the invention.

In a first exemplary aspect of the present disclosure, a method for detecting a low liquid level of a liquid contained within a cooking utensil placed on a heating element of a cooktop appliance during a cooking operation is provided. The method includes receiving a temperature signal from a liquid temperature sensor. The method also includes receiving a temperature signal from a cookware temperature sensor, wherein the temperature signal received from the cookware temperature is indicative of a surface temperature of the cooking utensil. Further, the method includes determining whether the surface temperature of the cooking utensil is greater than a set temperature error threshold. In addition, the method includes determining, if the surface temperature of the cooking utensil is not greater than the set temperature error threshold, whether a temperature of the liquid contained within the cooking utensil is less than a low liquid temperature threshold during the cooking operation based at least in part on the temperature signal received from the liquid temperature sensor. Moreover, the method includes generating a control action if the temperature of the liquid contained within the cooking utensil is less than the low liquid temperature threshold during the cooking operation.

In some implementations, the control action includes canceling the cooking operation.

In some implementations, the control action includes notifying a user that a low liquid level condition exists and logging a low liquid level fault.

In another exemplary embodiment of the present disclosure, a method for detecting a low liquid level of a liquid contained within a cooking utensil during a precise cooking operation is provided. The method includes receiving a temperature signal from a liquid temperature sensor during the precise cooking operation. The method also includes determining whether a temperature associated with the temperature signal is less than a target temperature threshold during the precise cooking operation. Further, the method includes generating a control action if the temperature associated with the temperature signal is less than the target temperature threshold during the precise cooking operation.

In yet another exemplary aspect of the present disclosure, a method for detecting a dried utensil condition of a cooking utensil containing a liquid and placed on a heating element of a cooktop appliance during a cooking operation is provided. The method includes receiving a temperature signal from a cookware temperature sensor, the temperature signal indicative of a surface temperature of the cooking utensil. The method also includes determining whether the liquid within the cooking utensil has reached a boiling temperature. Further, the method includes ascertaining, if the liquid within the cooking utensil has reached the boiling temperature, whether the surface temperature is greater than a predetermined temperature, wherein the predetermined temperature is greater than the boiling temperature. In addition, the method includes determining, if the surface temperature is greater than the predetermined temperature, whether the surface temperature has increased rapidly over a predetermined time. Moreover, the method includes generating a control action if the surface temperature has increased rapidly over the predetermined time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
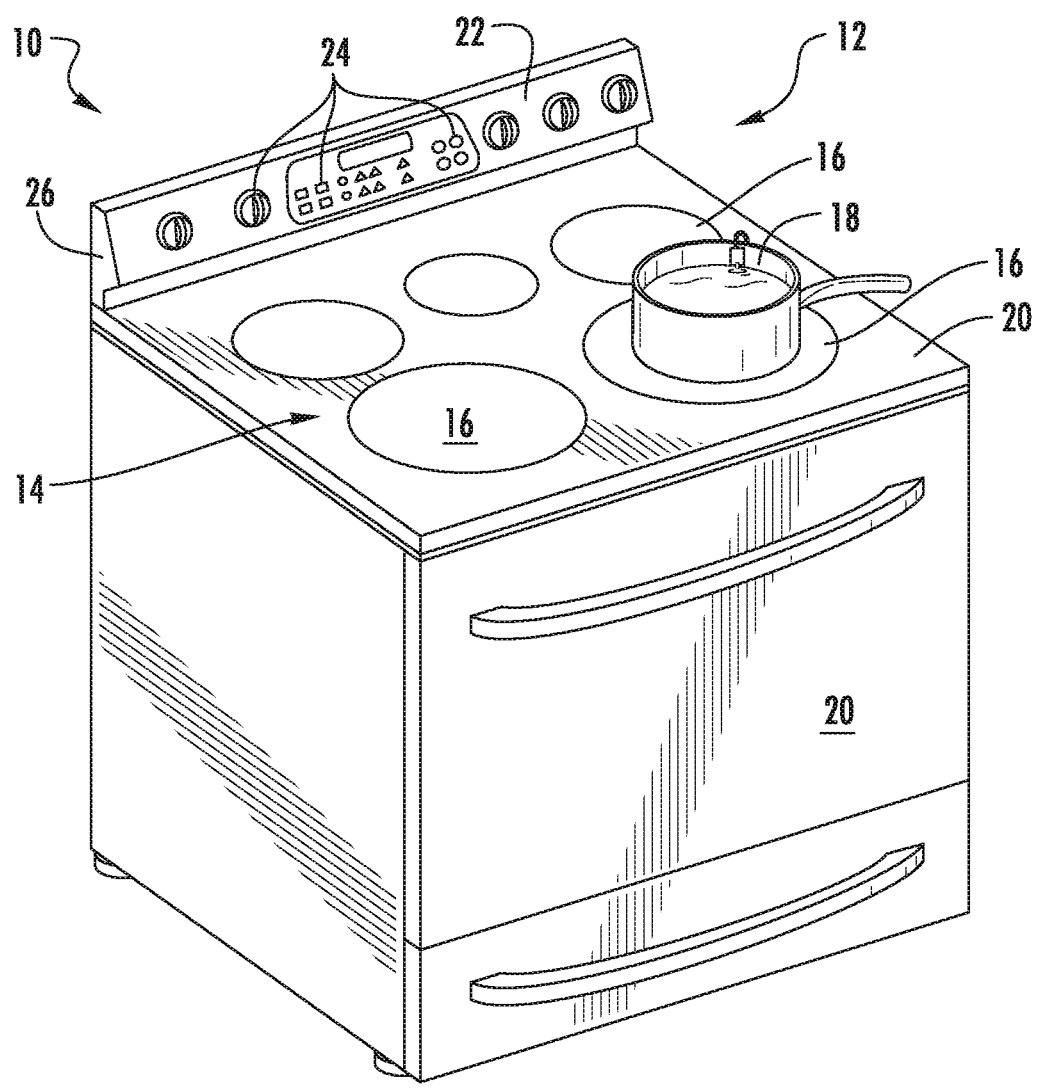
FIG. 1 provides a perspective view of a range having a cooktop appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a range appliance 10 that includes a cooktop appliance 12. Range 10 is provided by way of example only and is not intended to limit the present subject matter to the arrangement shown in FIG. 1. Thus, the present subject matter may be used with other range 10 and/or cooktop appliance 12 configurations, e.g., double oven range appliances, standalone cooktop appliances, cooktop range appliances without an oven, etc.

A panel or cooking surface 14 of cooktop appliance 12 includes a plurality of heating elements 16. For the embodiment depicted, the cooktop appliance 12 includes five (5) heating elements 16 spaced along cooking surface 14. In certain exemplary embodiments, cooktop appliance 12 may be a radiant cooktop appliance and cooking surface 14 may be constructed of a glass, ceramic, or a combination glass-ceramic material, or any other suitable material. In such embodiments, the heating elements 16 may be, e.g., electrical resistive heating elements. In other embodiments, the cooktop appliance 12 may include any other suitable shape, configuration, and/or number of heating elements 16. Additionally, in other embodiments, the cooktop appliance 12 may include any other suitable type of heating element 16, such as a gas burner heating element or an induction heating element. Each of the heating elements 16 may be the same type of heating element 16, or cooktop appliance 12 may include a combination of different types of heating elements 16.

As shown in FIG. 1, a cooking utensil 18, such as a pot, pan, or the like, may be placed on one of the heating elements 16 to heat the cooking utensil 18 and liquid contained therein, as well as to cook any food items placed in cooking utensil 18. Range appliance 10 also includes a door 20 that permits access to a cooking chamber (not shown) of range appliance 10, e.g., for cooking or baking of food items therein. A control panel 22 having controls 24 permits a user to make selections for cooking of food items and heating of liquids contained within cooking utensil 18. Although shown on a backsplash or back panel 26 of range appliance 10, control panel 22 may be positioned in any suitable location. Controls 24 may include buttons, knobs, and the like, as well as combinations thereof. As an example, a user may manipulate one or more controls 24 to select a temperature and/or a heat or power output for each heating element 16. The selected temperature or heat output of heating element 16 affects the heat transferred to cooking utensil 18 placed on heating element 16.

Figure 2:
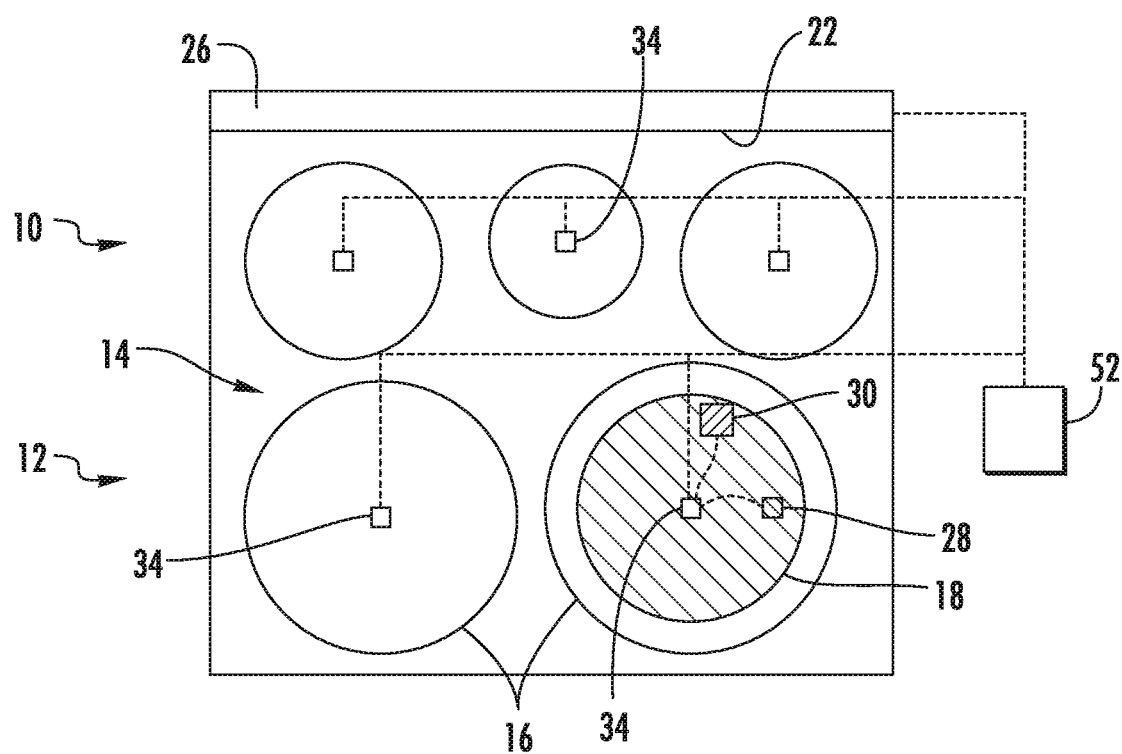
FIG. 2 provides a top, schematic view of the exemplary cooktop appliance of FIG. 1.

As will be discussed in greater detail below, cooktop appliance 12 includes a control system 50 (FIG. 3) for controlling one or more of the plurality of heating elements 16. Specifically, control system 50 includes a controller 52 (FIGS. 2 and 3) operably connected to control panel 22 (as shown in FIG. 2). The controller 52 may be operably connected to each of the plurality of heating elements 16 for controlling a power level/heating temperature of each of the plurality of heating elements 16 in response to one or more user inputs received through the control panel 22 and controls 24 or in response to a detected dangerous condition, such as e.g., a low liquid level in the cooking utensil 18 or a dried utensil or pot condition.

Figure 3:
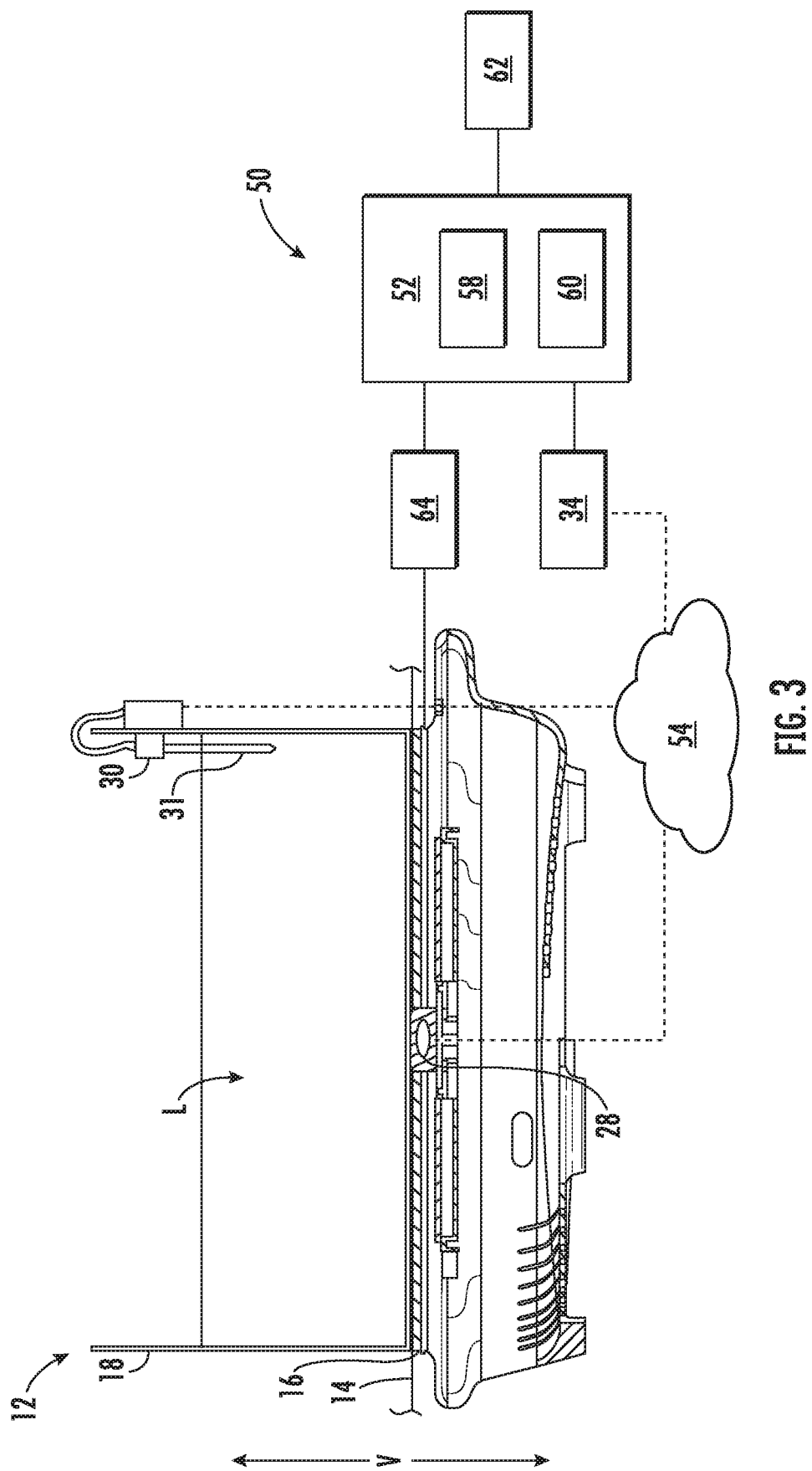
FIG. 3 provides a schematic diagram of a control system in accordance with an exemplary embodiment of the present disclosure as may be used with the exemplary cooktop appliance of FIG. 2.

With reference now to FIGS. 2 and 3, FIG. 2 provides a top, schematic view of the cooktop appliance 12 of FIG. 1 and FIG. 3 provides a schematic view of control system 50 for operating cooktop appliance 12 of FIG. 1 in accordance with an exemplary embodiment of the present disclosure. More specifically, FIG. 2 provides a top, schematic view of cooking surface 14 of the cooktop appliance 12 of FIG. 1 and FIG. 3 provides a schematic view of one of the heating elements 16 of the exemplary cooktop appliance 12 of FIGS. 1 and 2 and exemplary control system 50.

As shown in FIG. 2, the cooking surface 14 of the cooktop appliance 12 for the embodiment depicted includes five (5) heating elements 16 spaced along the cooking surface 14, as previously noted. Cooking utensil 18, also depicted schematically, is positioned on a first heating element 16 of the plurality of heating elements 16. For the embodiment depicted, a cookware temperature sensor 28 and a liquid temperature sensor 30 are also associated with the cooking utensil 18.

In some exemplary embodiments, as shown particularly in FIG. 3, cookware temperature sensor 28 is attached to or integral with the cooking surface 14 of the cooktop appliance 12. In such exemplary embodiments, the cookware temperature sensor 28 may be configured to physically contact the bottom surface of bottom wall of the cooking utensil 18 when the cooking utensil 18 is placed on the heating element 16 of the cooking surface 14. Each heating element 16 of cooktop appliance 12 may have an associated cookware temperature sensor 28, as depicted in FIG. 2. The cookware temperature sensors 28 may be positioned at the center of their respective heating elements. Other positions of the cookware temperature sensors 28 are contemplated. In alternative exemplary embodiments, the cookware temperature sensor 28 may be attached to or integrated into the cooking utensil 18 and configured to sense a temperature of, e.g., a bottom surface of the cooking utensil 18 or bottom wall of the cooking utensil 18. For example, the cookware temperature sensor 28 may be embedded within the bottom wall of the cooking utensil 18.

Further, as shown in FIG. 3, liquid temperature sensor 30 may be positioned at any suitable location to sense a temperature of liquid contained within cooking utensil 18. For example, liquid temperature sensor 30 may be a probe type temperature sensor configured to be mounted to a sidewall of cooking utensil 18. For instance, as shown in FIG. 3, liquid temperature sensor 30 is mounted to a sidewall of cooking utensil 18, e.g., by a magnetic attraction between an inner portion and an outer portion of the sensor 30. Liquid temperature sensor 30 includes a probe 31 that extends downward along a vertical direction V into an interior volume defined by the cooking utensil 18. In this way, when liquid is present in cooking utensil 18, probe 31 may sense the liquid temperature. In FIG. 3, probe 31 of liquid temperature sensor 30 is shown partially submerged within a liquid L contained within cooking utensil 18.

In certain exemplary embodiments, one or both of the cookware temperature sensor 28 or liquid temperature sensor 30 may utilize any suitable technology for sensing/determining a temperature of the cooking utensil 18 or liquid contained in the cooking utensil 18, respectively. For example, one or both of the liquid temperature sensor 30 or cookware temperature sensor 28 may utilize one or more thermocouples, thermistors, optical temperature sensors, infrared temperature sensors, etc.

Referring to FIG. 2, the cooktop appliance 12 additionally includes a plurality of receivers 34, each receiver 34 is associated with one of the heating elements 16. Each receiver 34 is configured to receive a temperature signal from its associated liquid temperature sensor 30 indicative of a temperature of the liquid contained within the cooking utensil 18 and from the cookware temperature sensor 28 indicative of a surface temperature of the cooking utensil 18 positioned on its associated heating element 16. In some embodiments, one or both of liquid temperature sensor 30 and cookware temperature sensor 28 may have integrated receivers 34, i.e., they each have receivers that are enclosed within their respective sensor housings. Further, in some embodiments, receivers 34 may be transceivers so that communication means is provided two-ways between the sensors and controller 52.

In some exemplary embodiments, one or both of the cookware temperature sensor 28 and liquid temperature sensor 30 may include wireless transmitting capabilities, or alternatively may be hard-wired to the receiver 34 through a wired communications bus. In yet other exemplary embodiments, the cooking utensil 18 may have a wireless transmitter operably connected to one or both of the cookware temperature sensor 28 and liquid temperature sensor 30 for transmitting signals to receiver 34.

With reference to FIGS. 2 and 3, for this embodiment, each heating element 16 of the cooktop appliance 12 includes an associated receiver 34. Each receiver 34 is positioned directly below a center portion of an associated heating element 16. Moreover, for the embodiment depicted, each receiver 34 is configured as a wireless receiver 34 configured to receive one or more wireless signals. Specifically, for the exemplary control system 50 depicted, each of the cookware temperature sensors 28 and the liquid temperature sensors 30 are configured as wireless sensors in wireless communication with the wireless receiver 34 via a wireless communication network 54. In certain exemplary embodiments, the wireless communication network 54 may be a wireless sensor network (such as a Bluetooth communication network), a wireless local area network (WLAN), a point-to point communication network (such as a radio frequency identification network, near field communication network, etc.), or a combination of two or more of the above communication networks.

As shown particularly in FIG. 3, each receiver 34 associated with a respective heating element 16 is operably connected to a controller 52 of the control system 50. The receivers 34 may be operably connected via a wired communication bus (as shown), or alternatively through a wireless communication network similar to the exemplary wireless communication network 54 discussed above. The controller 52 may generally include one or more processor(s) 58 and associated memory device(s) 60. Controller 52 may be configured to perform a variety of computer-implemented functions to control the exemplary cooktop appliance 12. Controller 52 may be a general purpose computer or a special purpose computer, or any other suitable computing device. Controller 52 may be a microcontroller, a microcomputer, a programmable logic controller (PLC), an application specific integrated circuit, and/or other programmable circuits. Additionally, the memory device(s) 60 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory 60 can store information accessible by processor(s) 58, including instructions that can be executed by processor(s) 58. For example, the instructions can be software or any set of instructions that when executed by the processor(s) 58, cause the processor(s) 58 to perform operations. For the embodiment depicted, the instructions may include a software package configured to operate the system to, e.g., execute the exemplary methods (100), (200), and (300) described below.

Referring still to FIG. 3, the control system 50 additionally includes a user interface 62 operably connected to the controller 52. For the embodiment depicted, the user interface 62 is configured in wired communication with the controller 52. However, in other exemplary embodiments, the user interface 62 may, additionally or alternatively, be wirelessly connected to the controller 52 via one or more suitable wireless communication networks (such as the exemplary wireless communication network 54 described above). In certain exemplary embodiments, user interface 62 may be configured as the control panel 22 and plurality of controls 24 on the cooktop appliance 12 (see FIG. 1). Additionally or alternatively, the user interface 62 may be configured as an external computing device, such as e.g., a smart phone, tablet, or other device capable of connecting to the controller 52 of the exemplary control system 50.

Further, the controller 52 is operably connected to each of the plurality of heating elements 16 for controlling a power lever/heating temperature of each of the plurality of heating elements 16 in response to one or more user inputs through the user interface 62 (e.g., control panel 22 and controls 24). Specifically, for the embodiment depicted, the controller 52 is operably connected to a plurality of power level control devices 64 (only one shown in FIG. 3), each power level control device 64 associated with a respective one of the heating elements 16. For example, where one or more of the heating elements 16 are configured as electric resistance heaters, the controller 52 may be operably connected to respective relays, triodes for alternating current, or other devices for controlling an amount of power to such electrical resistance heaters. Alternatively, where one or more of the heating elements 16 are configured as induction heating elements, the controller 52 may be operably connected to respective current control devices. Alternatively still, where one or more of the heating elements 16 are configured as gas burner heating elements, the controller 52 may be operably connected to one or more respective electronic or electromechanical gas valves.

Figure 4:
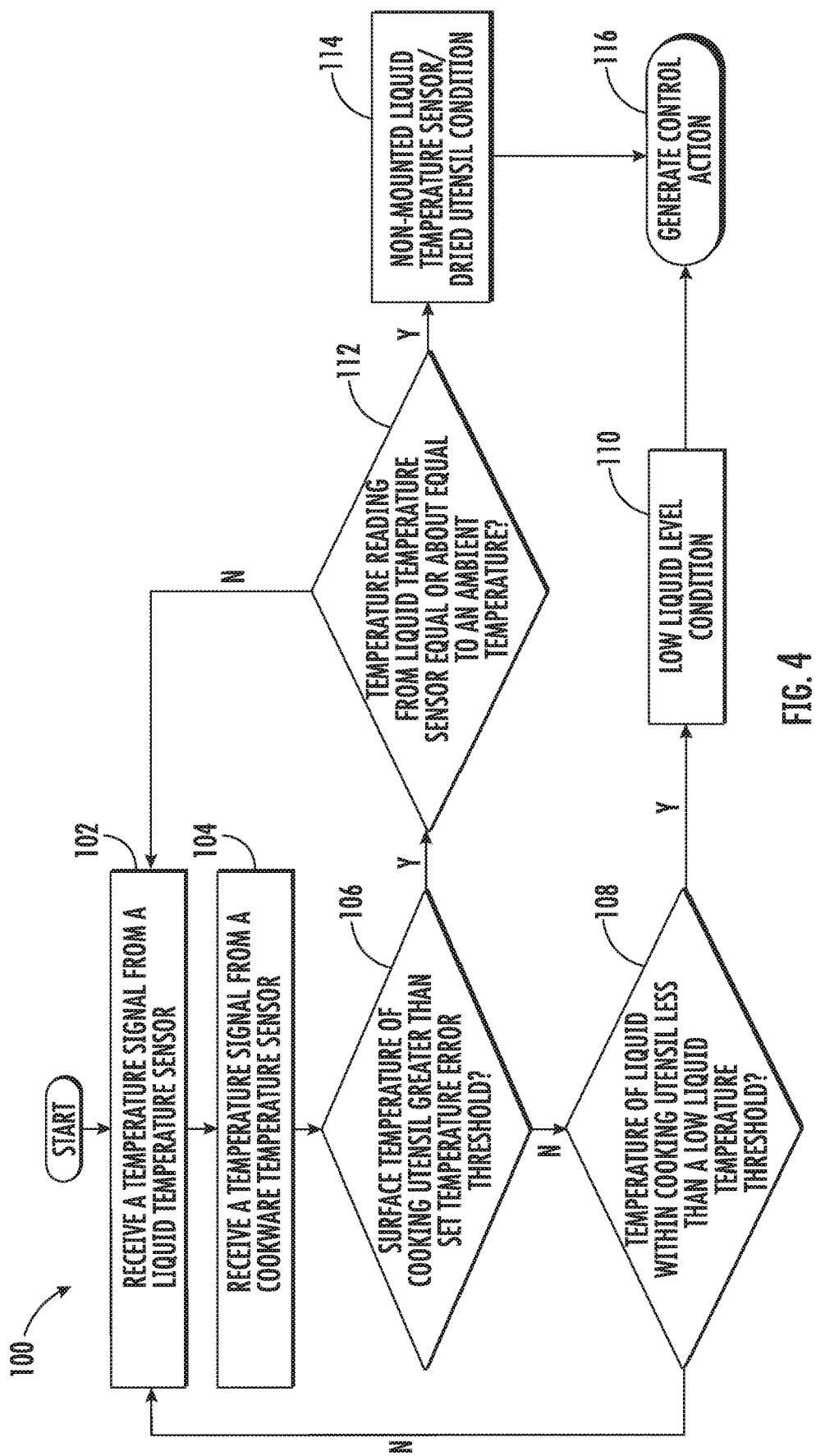
FIG. 4 provides a flow diagram of a method for detecting a low liquid level within and/or a dried cooking utensil condition of a cooking utensil placed on a heating element of a cooktop appliance during a cooking operation in accordance with an exemplary aspect of the present disclosure.

FIG. 4 provides a flow chart for an exemplary method (100) for detecting a low liquid level within and/or a dried cooking utensil condition of a cooking utensil placed on a heating element of a cooktop appliance during a cooking operation in accordance with an exemplary aspect of the present disclosure. Method (100) may be utilized with the exemplary cooktop appliance 12 and control system 50 described above with reference to FIGS. 1 through 3. Accordingly, method (100) may be utilized with a cooktop appliance including a cooking surface having a plurality of heating elements positioned thereon configured for heating liquids and/or one or more food items within a liquid contained in the cooking utensil placed on one of the heating elements. To provide context to method (100), reference numerals indicating the features of the cooktop appliance of FIGS. 1 through 3 will be utilized below.

At (102), method (100) includes receiving a temperature signal from a liquid temperature sensor. For instance, controller 52 may receive a temperature signal generated by liquid temperature sensor 30 during a cooking operation. Controller 52 may receive the temperature signal directly from liquid temperature sensor 30 or indirectly through one or more circuitry elements. Liquid temperature sensor 30 may be mounted to a sidewall of cooking utensil 18 as shown in FIG. 3, for example. In some instances, if the liquid temperature sensor 30 is submerged in the liquid contained within cooking utensil 18, the temperature signal is indicative of the temperature of the liquid within cooking utensil 18. However, in instances where the liquid temperature sensor is not submerged in the liquid within cooking utensil 18, the temperature signal may be indicative of an ambient temperature (e.g., air within the cooking utensil). Based on the temperature signal received, controller 52 may determine the temperature of the liquid within cooking utensil 18 or the ambient temperature, depending on whether liquid temperature sensor 30 is submerged in the liquid contained within cooking utensil 18. Preferably, prior to commencing a cooking operation, the liquid temperature sensor 30 is submerged in the liquid. In this way, if at some point during the cooking operation the liquid temperature sensor 30 is reading an ambient temperature, the controller 52 will recognize that there is a low liquid condition within the cooking utensil 18 and corrective action may be taken, e.g., the cooking operation can be canceled, as will be explained more fully below. Furthermore, in some exemplary embodiments, receiving at (102) may include receiving with a wireless receiver a wireless temperature signal generated by liquid temperature sensor 30. In alternative exemplary embodiments, receiving at (102) may include receiving the temperature signal generated by liquid temperature sensor 30 via a wired connection.

At (104), method (100) includes receiving a temperature signal from a cookware temperature sensor. For instance, controller 52 may receive a temperature signal generated by cookware temperature sensor 28. Controller 52 may receive the temperature signal directly from cookware temperature sensor 28 or indirectly through one or more circuitry elements. Cookware temperature sensor 28 may be attached to or integral with cooking surface 14 of cooktop appliance 12 as shown in FIG. 3, for example. Alternatively, cookware temperature sensor 28 may be embedded within cooking utensil 18, e.g., within a bottom surface of cooking utensil, as noted previously. Preferably, cookware temperature sensor 28 is positioned to sense a bottom surface of cooking utensil 18 when it is positioned on one of heating elements 16 as shown in FIG. 3. In this way, the temperature signal generated by the cookware temperature sensor 28 is indicative of the temperature of the bottom surface of cooking utensil 18. Accordingly, based on the temperature signal received, controller 52 may determine the temperature of the bottom surface of the cooking utensil 18. In addition, in some exemplary embodiments, receiving at (104) may include receiving with a wireless receiver a wireless temperature signal generated by cookware temperature sensor 28. In alternative exemplary embodiments, receiving at (104) may include receiving the temperature signal generated by cookware temperature sensor 28 via a wired connection.

At (106), method (100) includes determining whether the surface temperature of the cooking utensil is greater than a set temperature error threshold. That is, once controller 52 receives the temperature signal generated by the cookware temperature sensor 28 at (104), controller 52 determines the temperature of one of the surfaces of the cooking utensil 18. For example, the temperature signal may be indicative of the temperature of the bottom surface of the cooking utensil 18. Once controller 52 determines the temperature of the surface of the cooking utensil 18, at (106), the surface temperature of the cooking utensil 18 is compared against a set temperature error threshold. If the temperature of the surface of the cooking utensil 18 is greater than the set temperature error threshold, then method (100) proceeds to (112). If, however, the temperature of the surface of the cooking utensil 18 is not greater than the set temperature error threshold, then heating element 16 is meeting the set temperature and is working properly, and consequently, method (100) proceeds to (108).

The set error temperature threshold may be set within a predetermined percentage of a set temperature, or the temperature selected by the user, e.g., ninety degrees Celsius (90° C.). As one example, the set error temperature threshold may be set at a temperature that is five percent (5%) greater than the set temperature. As another example, the set error temperature threshold may be set five degrees Celsius (5° C.) above or greater than the set temperature.

At (108), if the surface temperature of the cooking utensil is not greater than the set temperature error threshold as determined at (106), method (100) includes determining whether a temperature of the liquid contained within the cooking utensil is less than a low liquid temperature threshold during the cooking operation based at least in part on the temperature signal received from the liquid temperature sensor. Thus, after determining at (106) that the surface temperature of the cooking utensil is not greater than the set temperature error threshold, the temperature of the liquid within the cooking utensil is checked against the low liquid temperature threshold. On one hand, if the temperature of the liquid within the cooking utensil is not less than the low liquid temperature threshold, then method (100) loops back to (102) where method (100) is repeated. On the other hand, if the temperature of the liquid within the cooking utensil is less than the low liquid temperature threshold, then there is a low liquid condition in the cooking utensil 18 and method proceeds to (110).

At (110), as noted above, if the temperature of the liquid within the cooking utensil is less than the low liquid temperature threshold as determined at (108), then a low liquid condition exists, which as noted previously, may produce less than ideal cooking performance, may potentially lead to dangerous conditions in and around the cooktop appliance 12 (e.g., fire), and may damage the cooking utensil 18. Accordingly, at (110), controller 52 identifies that the low liquid condition exists and proceeds to (116) where corrective action may be taken.

At (112), if the temperature of the surface of the cooking utensil is greater than the set temperature error threshold as determined at (106), then method (100) includes determining whether the temperature signal from the liquid temperature sensor is representative of a temperature that is about equal or equal to an ambient temperature. If the temperature of the surface of the cooking utensil is greater than the set temperature error threshold as determined at (106), then the surface temperature of the cooking utensil 18 has increased beyond the set temperature selected by the user, and more particularly, beyond the set temperature error threshold that is greater than the set temperature, e.g., five percent (5%) greater than the set temperature. In some instances, when the surface temperature of the cooking utensil 18 climbs above the set temperature error threshold, it is because of a dried cooking utensil condition, e.g., a condition in which the cooking utensil has little to no liquid contained therein and as a result the cooking utensil becomes burnt by the heating element 16 upon which it is positioned. At (112), it is determined whether the temperature reading (i.e., a temperature representative of the temperature signal generated by liquid temperature sensor 30) from the liquid temperature sensor 30 is equal to or about equal to an ambient temperature. If the temperature reading from the liquid temperature sensor 30 is equal to or about equal to the ambient temperature, the controller 52 determines that there is i) a dried cooking utensil condition; and/or ii) the liquid temperature sensor is not mounted on the cooking utensil 18, and accordingly, method (100) proceeds to (114). In this context, "about equal" to the ambient temperature means within a ten percent (10%) margin of the ambient temperature. If the temperature reading from the liquid temperature sensor 30 is not equal to or about equal to the ambient temperature, then method (100) returns to (102) where method (100) repeats.

In some implementations, to determine the ambient temperature, the method (100) includes receiving a temperature signal from an ambient temperature sensor. The temperature signal may be received by controller 52 wirelessly or via a wired connection. The ambient temperature sensor may be positioned in any suitable location on cooktop appliance 12 or range appliance 10. The ambient temperature sensor may be any suitable type of sensor capable of sensing the ambient temperature about the cooktop appliance 12. In yet other embodiments, method (100) includes obtaining an initial ambient temperature signal from the liquid temperature sensor prior to the liquid temperature sensor being submerged in the liquid within the cooking utensil. That is, prior to being submerged in the liquid within the cooking utensil 18, the liquid temperature sensor 30 may take an initial temperature reading that is indicative of the ambient temperature, and such initial ambient temperature reading may be stored, e.g., within memory device 60 of controller 52.

At (114), as noted above, if the temperature signal from the liquid temperature sensor is representative of a temperature that is about equal or equal to the ambient temperature as determined at (112), then a dried cooking utensil condition and/or a non-mounted liquid temperature sensor exists. As noted previously, the dried cooking utensil condition may lead to dangerous conditions in and around the cooktop appliance 12 (e.g., fire) and may damage the cooking utensil 18. If the liquid temperature sensor is in a non-mounted condition, less than ideal cooking performance may be achieved. For instance, in a sous vide or other precise cooking operation, the temperature of the liquid within cooking utensil 18 cannot be controlled as reliably. Accordingly, at (114) controller 52 identifies that one or both of the dried cooking utensil condition and/or a non-mounted liquid temperature sensor exists and proceeds to (116) where corrective action may be taken.

At (116), if the temperature of the liquid contained within the cooking utensil is less than the low liquid temperature threshold during the heating operation as determined at (108) or if the temperature signal from the liquid temperature sensor is representative of a temperature that is about equal or equal to an ambient temperature as determined at (112), then method (100) includes generating a control action. In some implementations, for example, the control action generated includes canceling the cooking operation. That is, controller 52 may automatically turn off power or gas to the heating element 16 on which cooking utensil 18 is positioned. In instances when a dried utensil condition is detected at (112), canceling the cooking operation may prevent fires, for example.

In some other implementations, additionally or alternatively to canceling the cooking operation, the control action includes notifying a user that a condition exists. The condition may be that a dried utensil condition exists (as determined at (112)), that a non-mounted liquid temperature sensor exists (as determined at (112)), or that a low liquid level condition exists (as determined at (108)). As one example, cooktop appliance 12 may include a speaker that audibly communicates the notification to a user. As another example, cooktop appliance 12 may include a communication interface that is operably connected with controller 52. The communication interface may include a network interface that provides for communication over a network, such as e.g., a wireless network. In such implementations, cooktop appliance 12 may send notifications to a user's mobile device, such as e.g., a cell phone. In further implementations, additionally or alternatively, the control action includes logging a low liquid condition fault, a dried utensil condition fault, or a non-mounted liquid temperature sensor condition fault. In this way, for example, if cooktop appliance 12 is serviced, an operator, service professional, or consumer may quickly ascertain why operation of cooktop appliance 12 was cancelled mid-cooking operation.

Figure 5:
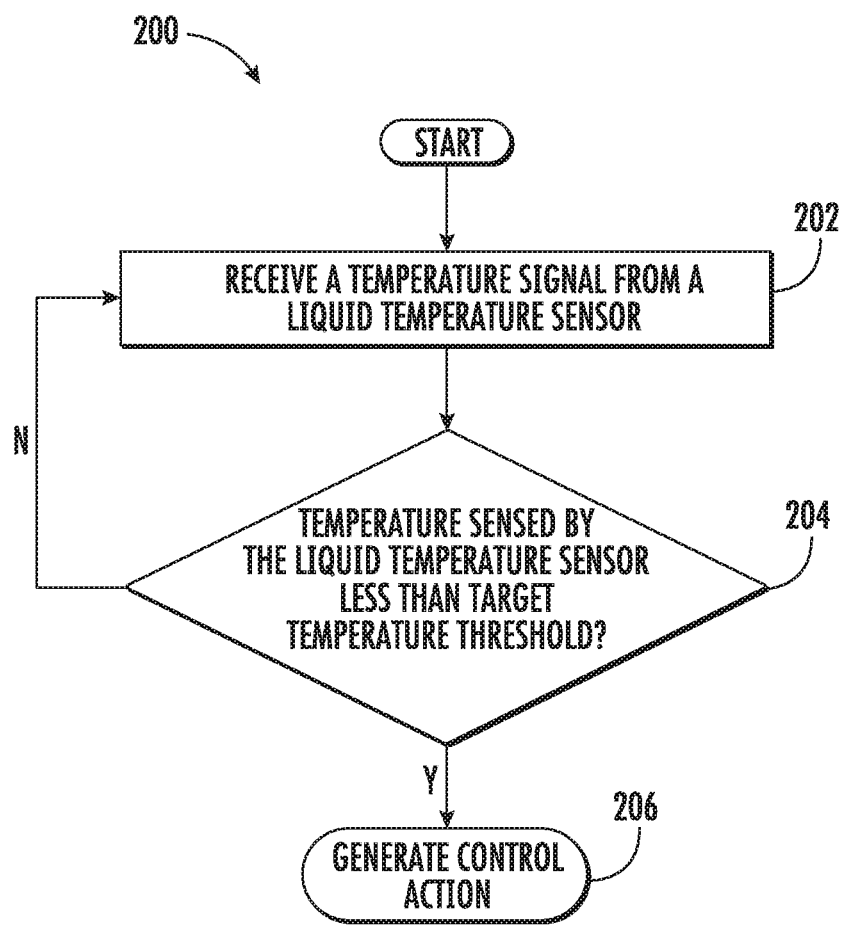
FIG. 5 provides a flow diagram of a method for detecting a low liquid level of a liquid contained within a cooking utensil during a precise cooking operation in accordance with an exemplary aspect of the present disclosure.

FIG. 5 provides a flow chart for an exemplary method (200) for detecting a low liquid level of a liquid contained within a cooking utensil during a precise cooking operation in accordance with an exemplary aspect of the present disclosure. Method (200) may be utilized with the exemplary cooktop appliance 12 and control system 50 described above with reference to FIGS. 1 through 3. Accordingly, method (200) may be utilized with a cooktop appliance including a cooking surface having a plurality of heating elements positioned thereon configured for heating liquids and/or one or more food items within the liquid contained in the cooking utensil placed on one of the heating elements. To provide context to method (200), reference numerals indicating the features of the cooktop appliance of FIGS. 1 through 3 will be utilized below.

During a precise cooking operation, such as a sous vide cooking operation, the heating element 16 on which cooking utensil 18 is positioned may cycle between an "on position"

and an "off position" throughout the precise cooking operation. For instance, once the target temperature of the liquid is reached (or a temperature within a predetermined range of the target temperature is reached, e.g., within one degree Celsius (1° C.)), the heating element 16 may be switched off, e.g., to conserve energy and maintain the precise selected temperature of the liquid. Method (200) thus applies even when the heating element 16 is in an off position.

At (202), method (200) includes receiving a temperature signal from a liquid temperature sensor during the precise cooking operation. For instance, controller 52 may receive a temperature signal generated by liquid temperature sensor 30 during a precise cooking operation (e.g., a sous vide cooking operation). Controller 52 may receive the temperature signal directly from liquid temperature sensor 30 or indirectly through one (1) or more circuitry elements. Liquid temperature sensor 30 may be mounted to a sidewall of cooking utensil 18 as shown in FIG. 3, for example. More particularly, as shown in FIG. 3, at least a portion of the liquid temperature sensor 30 extends downward along a vertical direction V into the cooking utensil 18 so that liquid temperature sensor 30 may sense the temperature of the liquid contained therein.

In some instances, if the liquid temperature sensor 30 is submerged in the liquid contained within cooking utensil 18, the temperature signal is indicative of the temperature of the liquid within cooking utensil 18. However, in instances where the liquid temperature sensor is not submerged in the liquid within cooking utensil 18, the temperature signal may be indicative of an ambient temperature (e.g., air within and about the cooking utensil). Based on the temperature signal received, controller 52 may determine the temperature of the liquid within cooking utensil 18 or the ambient temperature, depending on whether liquid temperature sensor 30 is submerged in the liquid contained within cooking utensil 18.

In some implementations, method (200) includes commencing the precise cooking operation, and prior to commencing the precise cooking operation, method (200) includes submerging at least a portion of the liquid temperature sensor in the liquid contained within the cooking utensil. In this way, if at some point during the cooking operation the liquid temperature sensor 30 is reading an ambient temperature, the controller 52 will recognize that there is a low liquid condition within the cooking utensil 18 and corrective action may be taken, e.g., the cooking operation can be canceled, as will be explained more fully below. Furthermore, in some exemplary embodiments, receiving at (202) may include receiving with a wireless receiver a wireless temperature signal generated by liquid temperature sensor 30. In alternative exemplary embodiments, receiving at (202) may include receiving the temperature signal generated by liquid temperature sensor 30 via a wired connection.

At (204), method (200) includes determining whether a temperature associated with the temperature signal is less than a target temperature threshold during the precise cooking operation. For instance, controller 52 may determine if the temperature associated with the temperature signal is less than a target temperature threshold during the precise cooking operation. If the temperature associated with the temperature signal is less than the target temperature threshold during the precise cooking operation, then it is determined that the volume of liquid within cooking utensil 18 is satisfactory and the method (200) loops back to (202) where method (200) is repeated. If the temperature associated with the temperature signal is less than the target temperature threshold during the precise cooking operation, then it is determined that a low liquid level condition exists and method (200) proceeds to (206).

The target temperature threshold may be set within a predetermined percentage of a target temperature of the liquid within cooking utensil 18, or the temperature selected by the user, e.g., fifty degrees Celsius (50° C.). As one example, the target temperature threshold may be set within a five percent (5%) margin of the set temperature. As another example, the target temperature threshold may be set as three degrees Celsius (3° C.) below the target temperature. In such an example, suppose the target temperature is sixty degrees Celsius (60° C.), and thus, the target temperature threshold is set to fifty-seven degrees Celsius (57°) by controller 52. If the temperature reading from the liquid temperature sensor is less than fifty-seven degrees Celsius (57°) (i.e., the target temperature threshold in this example) during the precise cooking operation, then controller 52 determines that a low liquid level condition exists. The target temperature threshold may be set in other suitable ways as well.

At (206), method (200) includes generating a control action if the temperature associated with the temperature signal is less than the target temperature threshold during the precise cooking operation. For instance, in some implementations, the control action includes canceling the precise cooking operation. If the heating element 16 is in an "on position," controller 52 may automatically turn off power or gas to the heating element 16 on which cooking utensil 18 is positioned. If the heating element 16 is in an "off position," controller 52 may prevent heating element 16 from switching or returning to the "on position" to continue the precise cooking operation, (e.g., by opening a switch in electrical communication with an induction heating element or resistive electric coil heating element to prevent a flow of current thereto, by opening a valve in fluid communication with a gas burner to selectively prevent a flow of gas to the burner, etc.). In this way, dried cooking utensil conditions may be prevented, among other benefits.

In yet other implementations, additionally or alternatively to canceling the cooking operation, the control action includes notifying a user that a low liquid level condition exists if the temperature associated with the temperature signal is less than the target temperature threshold during the precise cooking operation. As one example, cooktop appliance 12 may include a speaker that audibly communicates the notification that a low liquid level condition exists to a user. As another example, cooktop appliance 12 may include a communication interface that is operably connected with controller 52. The communication interface may include a network interface that provides for communication over a network, such as e.g., a wireless network. In such implementations, cooktop appliance 12 may send notifications to a user's mobile device, such as e.g., a cell phone. In further implementations, additionally or alternatively, the control action includes logging a low liquid level condition fault. In this way, for example, if cooktop appliance 12 is serviced, an operator, service professional, or consumer may quickly ascertain why operation of cooktop appliance 12 was cancelled in the middle of the precise cooking operation.

Figure 6:
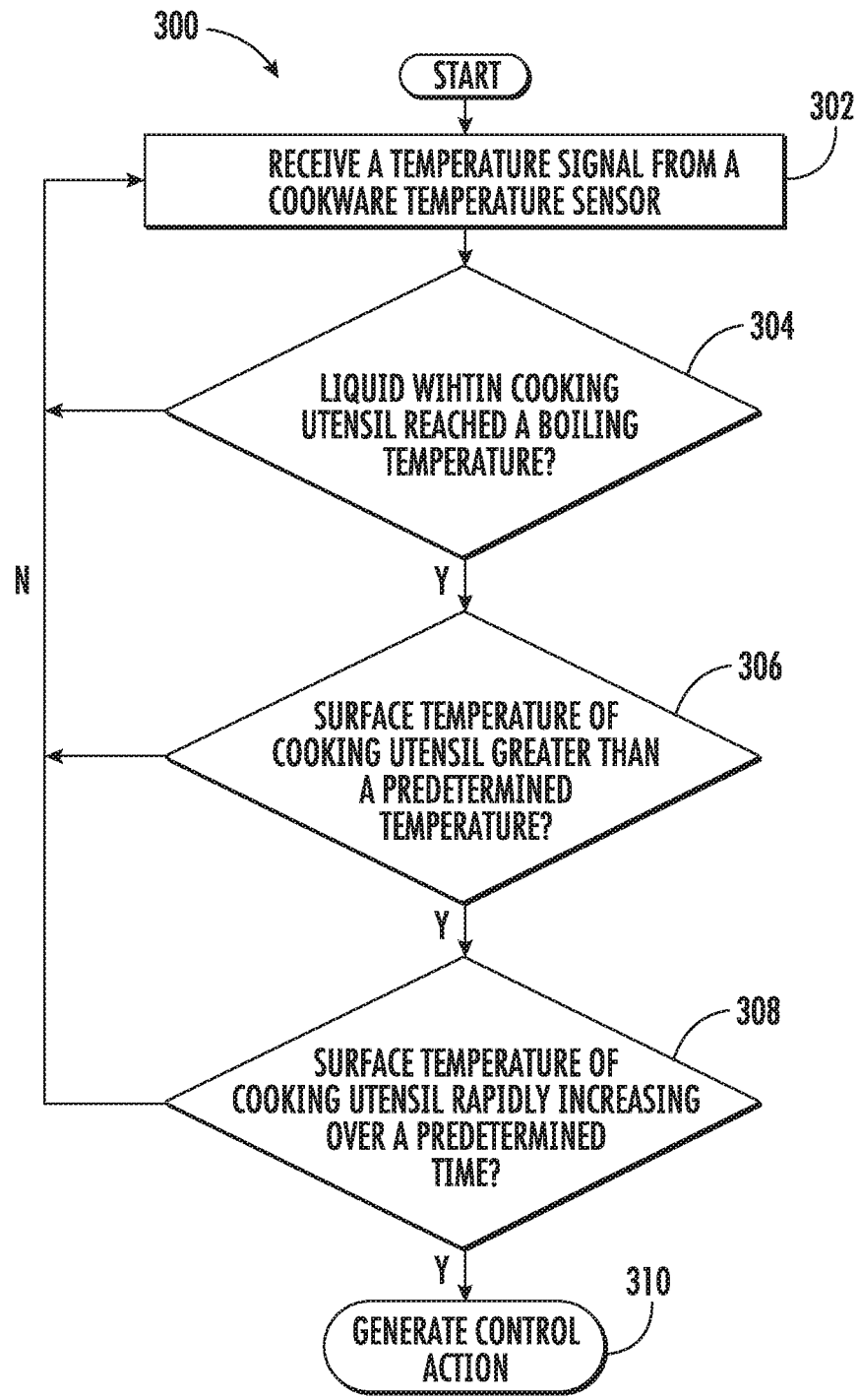
FIG. 6 provides a flow diagram of a method for detecting a dried utensil condition of a cooking utensil containing a liquid and placed on a heating element of a cooktop appliance during a boiling cooking operation in accordance with an exemplary aspect of the present disclosure.

FIG. 6 provides a flow chart for an exemplary method (300) for detecting a dried utensil condition of a cooking utensil containing a liquid and placed on a heating element of a cooktop appliance during a boiling cooking operation in accordance with an exemplary aspect of the present disclosure. Method (300) may be utilized with the exemplary cooktop appliance 12 and control system 50 described above with reference to FIGS. 1 through 3. Accordingly, method (300) may be utilized with a cooktop appliance including a cooking surface having a plurality of heating elements positioned thereon configured for heating liquids and/or one or more food items within a liquid contained in the cooking utensil placed on one of the heating elements. To provide context to method (300), reference numerals indicating the features of the cooktop appliance of FIGS. 1 through 3 will be utilized below.

At (302), method (300) includes receiving a temperature signal from a cookware temperature sensor, the temperature signal indicative of a surface temperature of the cooking utensil. For instance, controller 52 may receive a temperature signal generated by cookware temperature sensor 28. Controller 52 may receive the temperature signal directly from cookware temperature sensor 28 or indirectly through one or more circuitry elements. Cookware temperature sensor 28 may be attached to or integral with cooking surface 14 of cooktop appliance 12 as shown in FIG. 3, for example. Alternatively, cookware temperature sensor 28 may be embedded within cooking utensil 18, e.g., within a bottom surface of cooking utensil, as noted previously. Preferably, cookware temperature sensor 28 is positioned to sense a bottom surface of cooking utensil 18 when cooking utensil 18 is positioned on one of heating elements 16 as shown in FIG. 3. In this way, the temperature signal generated by the cookware temperature sensor 28 is indicative of the temperature of the bottom surface of cooking utensil 18. Accordingly, based on the temperature signal received, controller 52 may determine the temperature of the bottom surface of the cooking utensil 18. In addition, in some exemplary embodiments, receiving at (104) may include receiving with a wireless receiver a wireless temperature signal generated by cookware temperature sensor 28. In alternative exemplary embodiments, receiving at (104) may include receiving the temperature signal generated by cookware temperature sensor 28 via a wired connection.

Figure 7:
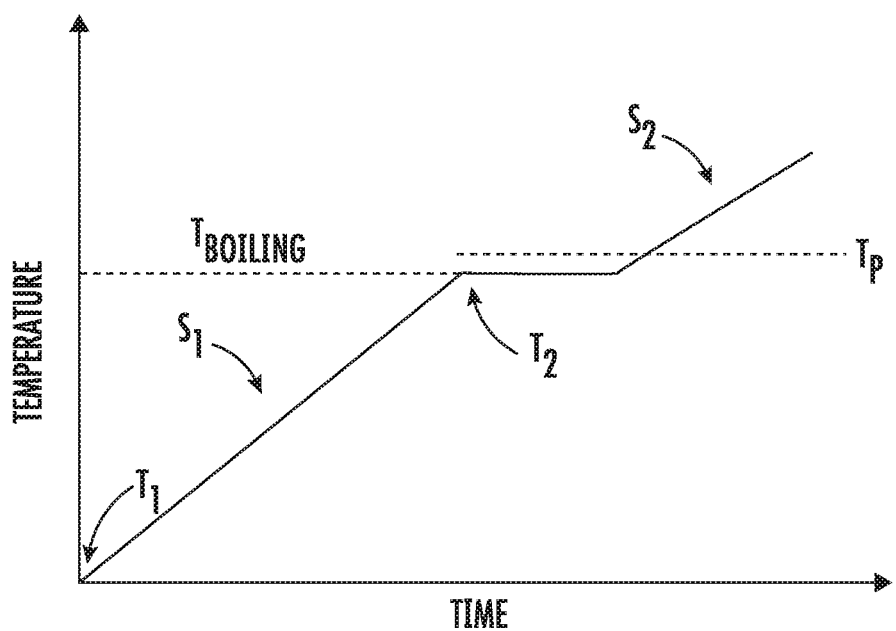
FIG. 7 provides a chart depicting the slope of a surface temperature of a cooking utensil as a function of time in accordance with an exemplary aspect of the present disclosure.

In some implementations, the slope of the temperature over time is tracked by controller 52. For instance, FIG. 7 provides a chart depicting the slope of the surface temperature of cooking utensil 18 as a function of time. The slope of the surface temperature may be plotted by controller 52 based at least in part on the temperature signals received from cookware temperature sensor 28.

At (304), method (300) includes determining whether the liquid within the cooking utensil has reached a boiling temperature. As one example, controller 52 may predict when the liquid within cooking utensil 18 based at least in part on the slope of the surface temperature. As another example, the method (300) includes receiving a temperature signal from a liquid temperature sensor mounted on the cooking utensil. The liquid temperature sensor 30 is configured to detect the temperature of the liquid within the cooking utensil 18 when liquid temperature sensor 30 is submerged in the liquid. Thus, if the temperature signals received from the liquid temperature sensor 30 are indicative of a liquid boiling temperature, denoted $T_{BOILING}$ in FIG. 7 (e.g., one hundred degrees Celsius (100° C.) for water), then controller 52 may determine if the liquid within the cooking utensil 18 is boiling. If the liquid within the cooking utensil 18 has reached a boiling temperature, then method (300) proceeds to (306). If, however, the liquid within the cooking utensil 18 has not reached a boiling temperature, then method (300) loops back to (302) where the method (300) repeated.

At (306), method (300) includes ascertaining, if the liquid within the cooking utensil has reached the boiling temperature, whether a surface temperature of the cooking utensil is greater than a predetermined temperature, wherein the predetermined temperature is greater than the boiling temperature. For instance, as shown in FIG. 7, the surface temperature of the cooking utensil 18 is compared against to predetermined temperature $T_P$. If the surface temperature is greater than the predetermined temperature $T_P$, then controller 52 recognizes that temperature slope is no longer flat and that the slope should be monitored more closely, and accordingly, method (300) proceeds to (308). If, however, the surface temperature is not greater than the predetermined temperature $T_P$, then method (300) loops back to (302) where method (300) is repeated.

At (308), method (300) includes determining, if the surface temperature of the cooking utensil is greater than the predetermined temperature, whether the surface temperature has increased rapidly over a predetermined time. In some implementations, the predetermined time commences when the determination is made at (306) that the surface temperature of the cooking utensil 18 is greater than the predetermined temperature $T_P$. That is, the predetermined time commences simultaneously with the determination that the surface temperature of the cooking utensil 18 is greater than the predetermined temperature $T_P$. In some other implementations, the predetermined time may commence after the determination at (306) is made. If the surface temperature has increased rapidly over the predetermined time, controller 52 determines that a dried utensil condition exists, e.g., cooking utensil 18 is being burnt by heating element 16, and accordingly, method (300) proceeds to (310) so that corrective action may be taken. If, however, the surface temperature has increased rapidly over the predetermined time, controller 52 determines that a dried utensil condition does not exist and method (300) loops to (302) where method (300) is repeated.

In some implementations, determining whether the surface temperature of the cooking utensil has increased rapidly over the predetermined time is determined by tracking the slope of the surface temperature. As shown in FIG. 7, after the surface temperature stabilizes at the boiling point temperature for a period of time (as shown by the flat portion of the temperature line having a slope of zero (0) in FIG. 7), the surface temperature increases above the predetermined temperature $T_P$. Thus, the logic proceeds to (308) and it is determined whether the slope of the line increases rapidly. As one example, if the surface temperature of the cooking utensil 18 increases by more than ten degrees Celsius (10° C.) in less than or equal to one minute (i.e., the predetermined time in this example), then the surface temperature of the cooking utensil can be deemed to have increased rapidly over the predetermined time. As another example, "increased rapidly" may be a surface temperature increase of more than twenty degrees (20°) in one (1) minute or less. As another example, "increased rapidly" may be a surface temperature increase of more than thirty degrees) (30°) in one (1) minute or less.

With reference to FIG. 7, in some implementations, whether the rise in surface temperature has "increased rapidly" over the predetermined time is determined based at least in part on an initial slope $S_1$ of the surface temperature of the cooking utensil over a predetermined period. For instance, in this implementation, the initial slope $S_1$ is the average slope of the temperature over the predetermined period. In this example, the initial slope is indicative of an average slope of the surface temperature of the cooking utensil as a function of time over the predetermined period. As depicted in FIG. 7, for this example, the predetermined time period is a time that spans between an initial temperature $T_1$ to a boiling temperature $T_2$ of the surface temperature of the cooking utensil. By considering the initial slope $S_1$ and other parameters, such as e.g., the heating setting of the heating element 16, controller 52 may determine what constitutes a slope $S_2$ that corresponds with a rapid increase of the surface temperature after reaching a boiling temperature. For instance, the greater the value of the initial slope $S_1$, the greater the value that slope $S_2$ must be to constitute the temperature "rapidly increasing" over the predetermined time. Conversely, the lesser the value of the initial slope $S_1$, the lesser the value that slope $S_2$ must be to constitute the temperature "rapidly increasing" over the predetermined time.

At (310), method (300) includes generating a control action if the surface temperature of the cooking utensil has increased rapidly over the predetermined time. For instance, in some implementations, the control action includes canceling the cooking operation. As one example, power to the heating element 16 can be switched off (e.g., by opening a switch in electrical communication with an induction heating element or resistive electric coil heating element to prevent a flow of current thereto). In this way, dried cooking utensil conditions may be prevented, among other benefits.

In yet other implementations, additionally or alternatively to canceling the cooking operation, the control action includes notifying a user that a dried utensil condition exists if the surface temperature rapidly increases. As one example, cooktop appliance 12 may include a speaker that audibly communicates the notification that a dried utensil condition exists to a user. As another example, cooktop appliance 12 may include a communication interface that is operably connected with controller 52. The communication interface may include a network interface that provides for communication over a network, such as e.g., a wireless network. In such implementations, cooktop appliance 12 may send notifications to a user's mobile device, such as e.g., a laptop. In further implementations, additionally or alternatively, the control action includes logging a dried utensil condition fault. In this way, for example, if cooktop appliance 12 is serviced, an operator, service professional, or consumer may quickly ascertain why operation of cooktop appliance 12 was cancelled during the cooking operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting a low liquid level of a liquid contained within a cooking utensil placed on a heating element of a cooktop appliance during a cooking operation, the method comprising:

receiving a temperature signal from a liquid temperature sensor;

receiving a temperature signal from a cookware temperature sensor, wherein the temperature signal received from the cookware temperature sensor is indicative of a surface temperature of the cooking utensil;

determining whether the surface temperature of the cooking utensil is greater than a set temperature error threshold;

determining, if the surface temperature of the cooking utensil is not greater than the set temperature error threshold, whether a temperature of the liquid contained within the cooking utensil is less than a low liquid temperature threshold during the cooking operation based at least in part on the temperature signal received from the liquid temperature sensor; and generating a control action if the temperature of the liquid contained within the cooking utensil is less than the low liquid temperature threshold during the cooking operation.

2. The method of claim 1, wherein the control action comprises:

canceling the cooking operation.

3. The method of claim 1, wherein the control action comprises:

notifying a user that a low liquid level condition exists; and logging a low liquid level fault.

4. The method of claim 1, further comprising:

receiving a temperature signal that is indicative of an ambient temperature; and determining, if the surface temperature of the cooking utensil is greater than the set temperature error threshold, whether the temperature signal from the liquid temperature sensor is representative of a temperature that is about equal or equal to the ambient temperature.

5. The method of claim 4, wherein, if the temperature associated with the temperature signal from the liquid temperature sensor is about equal or equal to the ambient temperature, the method further comprises:

generating a control action.

6. The method of claim 5, wherein the control action comprises notifying a user that one of a dried utensil condition and a non-mounted liquid temperature sensor condition exists if the temperature associated with the temperature signal from the liquid temperature sensor is about equal or equal to the ambient temperature.

7. The method of claim 5, wherein the control action comprises canceling the cooking operation.

8. The method of claim 1, wherein the cooktop appliance comprises:

a controller;

a wireless receiver operably connected to the controller, wherein the controller is configured to receive the temperature signal from the cookware temperature sensor using the wireless receiver and wherein the controller is configured to receive the temperature signal from the liquid temperature sensor using the wireless receiver.

* * * * *